Patented Sept. 8, 1936

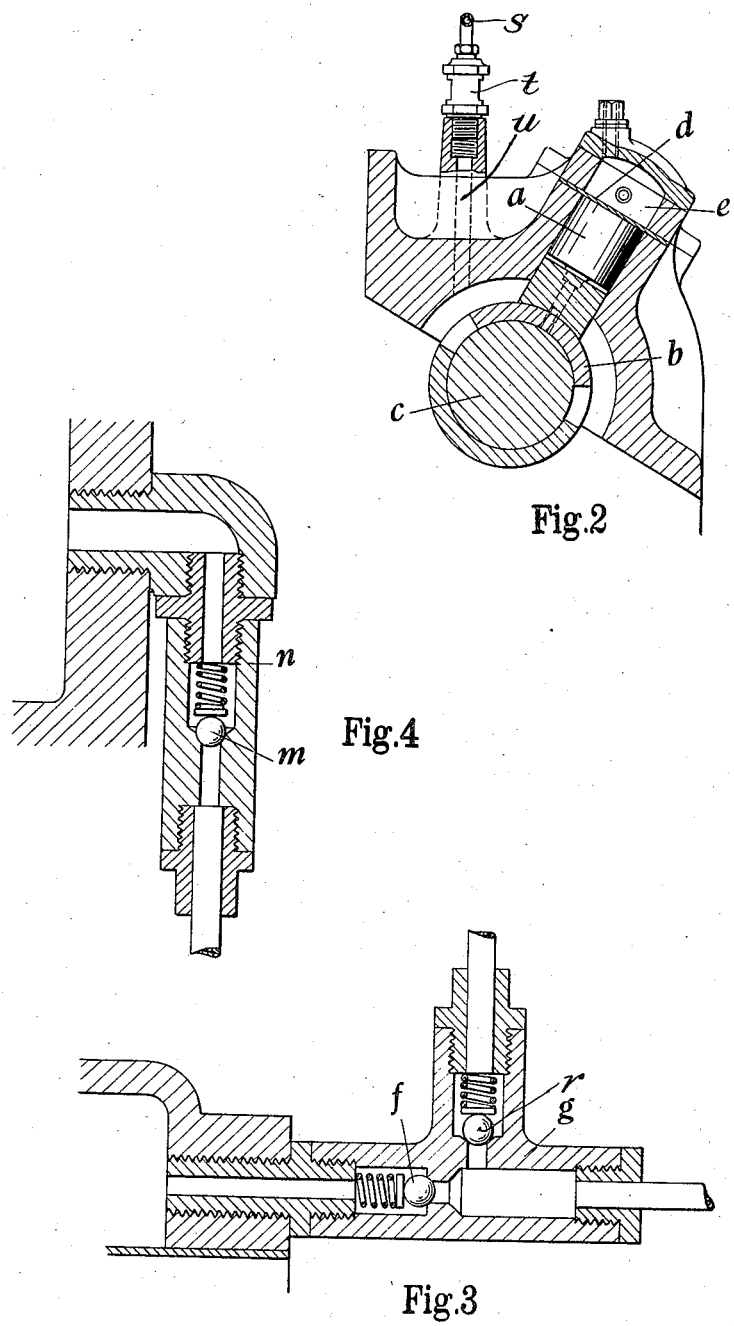

2,053,389

UNITED STATES PATENT OFFICE 2,053,389

SPINDLE BEARING

Harry Hales Asbridge, Ashton-on-Mersey, England, assignor to The Churchill Machine Tool Company Limited, Broadheath, near Manchester, England, a British company Application July 18, 1935, Serial No. 32,097
In Great Britain October 8, 1934

5 Claims. (Cl. 308—9)

This invention is an improvement in or modification of the invention described and claimed in the specification of my prior Patent No. 2,028,487 (application No. 713,595, filed March 1st, 1934).

The said prior specification describes a spindle thrust or journal bearing loading means in which hydraulic pressure of a predetermined maximum amount is applied to the bearing through a non-return valve so that even though a low hydraulic pressure is employed to ensure efficient running conditions, the non-return valve serves to trap the hydraulic fluid so that it constitutes a non-yielding abutment resisting any tendency of the bearing to overcome the hydraulic loading pressure.

The object of the present invention is to provide an improvement in the said hydraulic loading means which ensures the efficient maintenance of the hydraulic load under all working conditions.

The invention comprises the provision between the or each part by which the bearing is loaded and the hydraulic loading pressure, of a diaphragm which serves to transmit the hydraulic loading pressure to the said part but prevents the escape or leakage of the hydraulic fluid thereat.

Referring to the accompanying sheets of explanatory drawings:—

Figure 2 is a cross section on the line A B of Figure 1 illustrating the upper part of a bearing.

Figures 3 and 4 are detail sectional views of the non-return valves shown in Figure 1.

Figure 1:
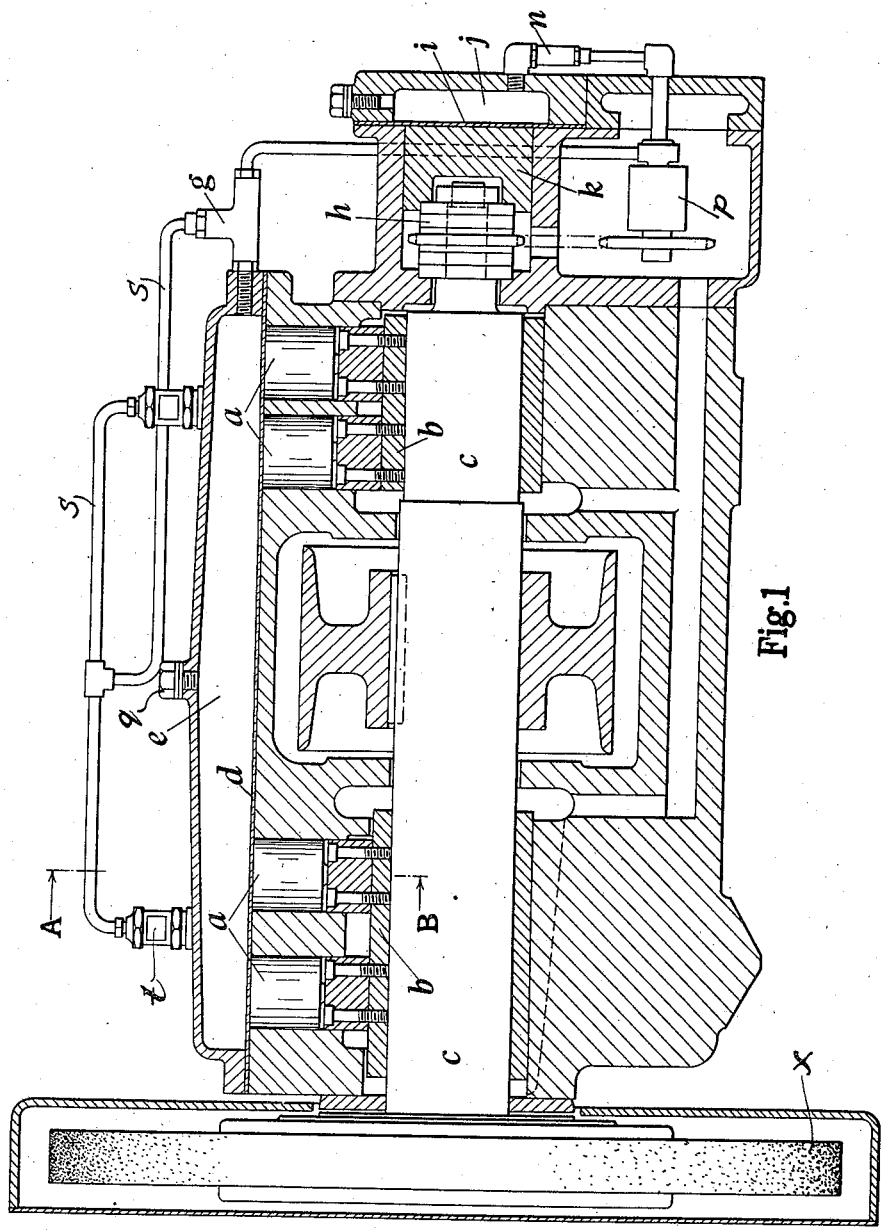
Figure 1 is a longitudinal section of a rotary shaft having its bearings loaded in one convenient form in accordance with this invention.

The invention is illustrated as applied to the bearings of a grinding wheel $x$.

There are a number of pistons $a$ (in this case four) by which the hydraulic loading pressure is applied to the movable bearing member $b$ upon the shaft $c$, each piston $a$ being in direct contact with a diaphragm $d$ to which the hydraulic pressure in the chamber or compartment $e$ is applied.

Oil is fed into the chamber $e$ by the pump $p$, which may be an ordinary lubricating pump driven from the spindle $c$, past the non-return valve $f$. If the spindle $c$ tends to rise and lift the pistons $a$ and the diaphragm $d$ the oil trapped in the chamber $e$ forms an incompressible abutment and resists the lift of the spindle.

Bleed screws $q$ enable air to be removed from the chamber $e$ when necessary so that the contents of the chamber are incompressible, these screws are then clamped tightly down again to render the chamber $e$ fluid tight.

On the pump side of the non-return valve $f$ is a relief valve $r$ through which oil passes and by the lubricating pipes $s$, oilers $t$ and lubricating ducts $u$ to the bearing surfaces. Thus the lubricating pump $p$ continues to fulfill its normal function of lubricating the bearings, the amount of oil required for the chamber $e$ being very slight and being merely to keep this chamber completely full despite any slight leakages.

It will be appreciated that in order to ensure free movement of the pistons $a$ they have to be a free fit in their cylinders and that in consequence slight leakage of hydraulic fluid may occur between the pistons and cylinder walls. By causing the loading pressure to act upon a diaphragm in contact with the pistons, I ensure that the hydraulic pressure will be maintained in the chamber or compartment $e$ when the non-return valve $f$ in the combined non-return and release valve fitting $g$ is closed, even if the bearing tends to rise or overcome the hydraulic pressure for an appreciable interval of time.

The same construction is applied to the hydraulic loading of the thrust bearing $h$ where a diaphragm $i$ is interposed between the hydraulic fluid compartment $j$ and the piston $k$. The non-return valve $m$ is in the fitting $n$ shown in section in Figure 4.

It will be noted that the diaphragm is subject to only very small movements and so will last indefinitely. It can be made of copper or other suitable metal or material. The hydraulic fluid compartments $e$ and $j$ are detachable and serve to clamp the diaphragms in place.

I am aware that a journal bearing has been proposed in which a gear spindle was supported above and below by two series of pistons, each of which pistons was in contact with a diaphragm the further side of which was subjected to hydraulic pressure. In the said prior construction the diaphragm was held in position by a ring secured to the diaphragm chamber casing and was acted upon by fluid under pressure which was admitted to the diaphragm chamber from a high pressure source when the spindle moved.

I claim:

1. A spindle thrust or journal bearing comprising two portions, one portion being fixed and one movable towards and away from said fixed portion, together with means to apply a hydraulic load to said movable portion comprising a member movable with said movable portion adapted by its movements to vary the volume of a substantially fluid tight chamber, an orifice in said chamber adapted for admission of hydraulic fluid thereto, a non-return valve in said orifice, a pump arranged to deliver hydraulic fluid through said non-return valve together with a relief valve arranged between said pump and said non-return valve, and a flexible fluid-tight diaphragm disposed between said movable member and said chamber.

2. A spindle thrust or journal bearing as claimed in claim 1 wherein the relief valve specified is adapted to deliver fluid to a lubricating duct leading to said bearing.

3. A spindle thrust or journal bearing comprising two portions, one portion being fixed and one movable towards and away from said fixed portion, together with means to apply a hydraulic load to said movable portion comprising a piston working in a cylinder, a flexible fluid tight diaphragm extending across said cylinder in contact with said piston at the side thereof remote from said movable portion, a fluid tight chamber beyond said diaphragm, an orifice in said chamber adapted for admission of hydraulic fluid thereto and a non-return valve associated with said orifice.

4. A spindle thrust or journal bearing as claimed in claim 3 wherein the said chamber serves to clamp the edges of said diaphragm in position.

5. A spindle journal bearing comprising two portions, one portion being fixed and one movable towards and away from said fixed portion, together with means to apply a hydraulic load to said movable portion comprising a plurality of pistons in cylinders in a cylinder block, a flexible fluid tight diaphragm extending across said cylinder block in contact with said pistons at the sides thereof remote from said movable portion, said diaphragm forming one wall of a fluid tight chamber and being clamped between said chamber and said cylinder block, an orifice in said chamber adapted for admission of hydraulic fluid thereto and a non-return valve associated with said orifice.

HARRY HALES ASBRIDGE.